United States Patent [19]

Sato et al.

[11] Patent Number: 4,990,481

[45] Date of Patent: Feb. 5, 1991

[54] CATALYST FOR STEAM REFORMING

[75] Inventors: Nobuhiro Sato, Aichi; Kozo Ohsaki, Chiba; Katsutoshi Kikuchi, Chiba; Yoshitsugu Hirota, Chiba; Toru Numaguchi, Chiba; Noboru Mochiduki, Chiba, all of Japan

[73] Assignee: Toyo Engineering Corporation, Tokyo, Japan

[21] Appl. No.: 345,430

[22] Filed: Apr. 28, 1989

[30] Foreign Application Priority Data

May 20, 1988 [JP] Japan .................................. 63-123221
Apr. 10, 1989 [JP] Japan ..................................... 1-89993

[51] Int. Cl.$^5$ ......................... B01J 21/04; B01J 23/74
[52] U.S. Cl. .................................................... 502/335
[58] Field of Search ......................................... 502/335

[56] References Cited

U.S. PATENT DOCUMENTS

| | | | |
|---|---|---|---|
| 3,759,678 | 9/1973 | Chamberland et al. | 502/335 X |
| 4,216,123 | 8/1980 | Banks et al. | 502/335 |
| 4,285,837 | 8/1981 | Sato et al. | 502/335 |

Primary Examiner—W. J. Shine
Attorney, Agent, or Firm—Flynn, Thiel, Boutell & Tanis

[57] ABSTRACT

A catalyst for steam reforming of a hydrocarbon or alcohol carrying from three to twenty weight percent of nickel as nickel oxide, which is made by immersing alumina particles in a nickel containing solution, drying and then calcining the particles, which alumina particles are of α-alumina and of 98 weight percent or more purity and has a pore volume of the pores having a diameter of from 0.1 to 0.5 micron of 0.2 ml/g or more and a pore volume of the pores having a diameter of 0.5 microns or more of 0.05 ml/g or more.

11 Claims, 1 Drawing Sheet

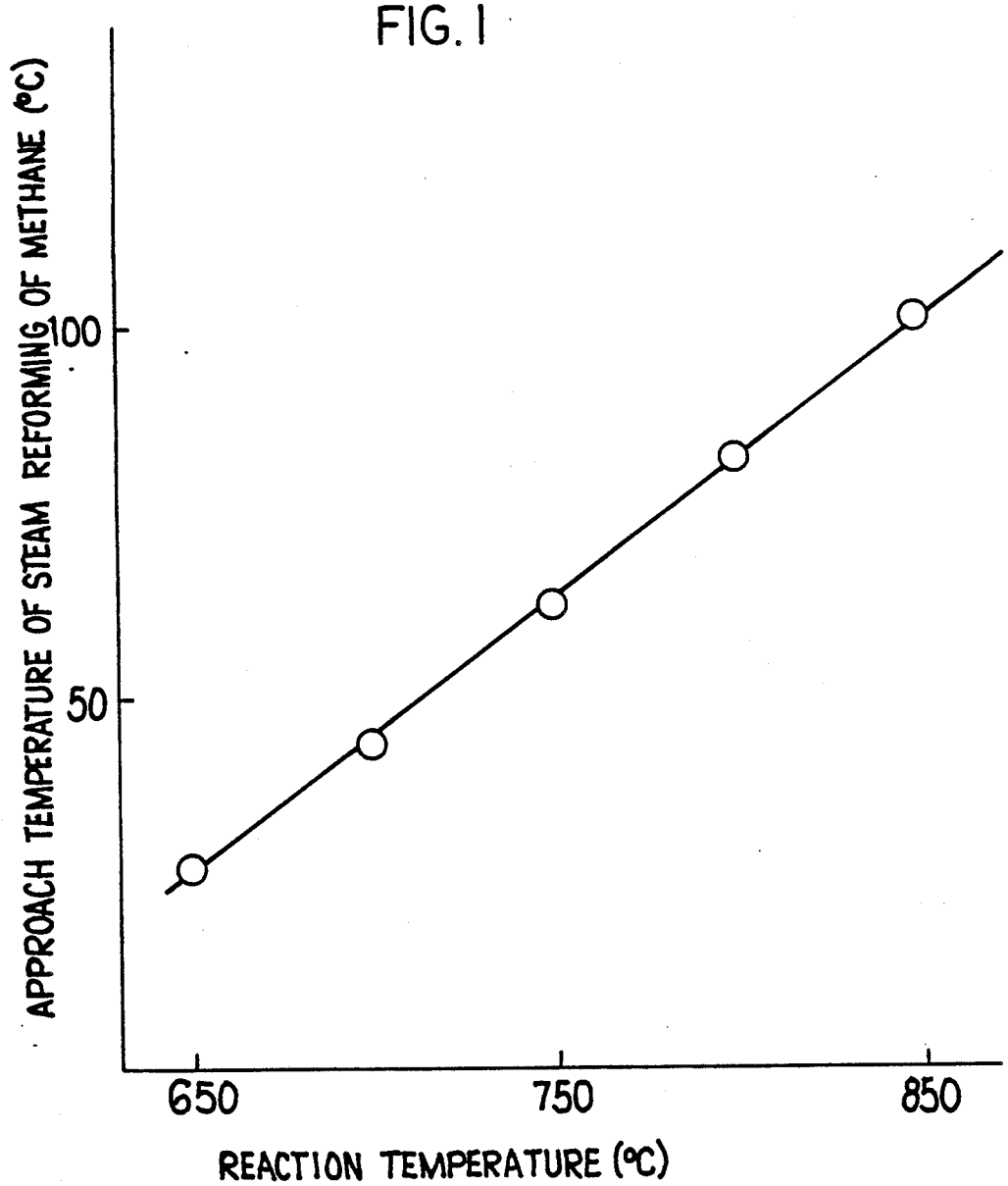

CATALYST FOR STEAM REFORMING

FIELD OF INDUSTRIAL UTILIZATION

This invention relates to a catalyst that is employed in the reforming of hydrocarbons or the like with steam to produce a gas mixture comprising hydrogen and carbon monoxide.

PRIOR ART

It has been previously known that a catalyst comprising a heat-resisting carrier of aluminum oxide, silica, etc., and a catalytically active component of nickel can be employed for reforming hydrocarbons or the like with steam. However, a catalyst of that kind, having an activity at a low temperature, is rather unstable to heat and, therefore, has a drawback in that its activity is reduced when it is subjected to a temperature higher than a certain level.

SUMMARY OF THE INVENTION

U.S. Pat. No. 4 285 837 discloses a catalyst to solve the above shown problem which is used in the steam reforming of hydrocarbons for the purpose of producing a fuel gas mainly containing methane, in which a nickel oxide catalyst is carried on a porous body of active alumina mainly comprising $\gamma$-(gamma-)alumina obtained by calcining (or firing or burning) boehmite gel.

The inventors have further studied the application of this type of catalyst to the steam reforming of hydrocarbons or lower alcohols to produce a gas mainly comprising hydrogen and carbon monoxide.

In this study, a plurality of catalysts were made by varying the characteristics of a porous body of active alumina, and the catalytic activity of them was precisely compared in a series of experiments. The variation in the characteristics of the porous body was attained by varying the temperature at which the porous alumina (porous bodies of active alumina) was fired.

As a result of the study, the inventors have found that a catalyst as described below shows excellent results in the steam reforming of hydrocarbons or the like for the purpose of the present invention.

In the catalyst of the invention, nickel, as the presently active species, (or ingredient) is carried in an amount, based on the total amount by weight of the catalyst, of from 3 to 20 percent, preferably from 5 to 15 percent, more preferably from 5 to 10 percent in weight, calculated as nickel oxide, on a porous body of highly pure aluminium oxide which is an $\alpha$-(alpha-)alumina obtained by the heat treatment of a starting material of boehmite alumina via $\gamma$-(gamma)alumina and $\delta$-(delta-)alumina, and is a porous structured body with an apparent porosity of from 50 to 80 percent, preferably 50 to 70 percent, a pore volume of pores having a pore diameter ranging from 0.1 to 0.5 micron of not less than 0.2 ml/g and a the pore volume of pores having a pore diameter of more than 0.5 micron of not less than 0.05 ml/g and a purity of not less than 98% by weight.

The invention provides a process for steam-reforming a hydrocarbon or a mixture of hydrocarbons into a reaction mixture including hydrogen gas and carbon monoxide in the presence of the catalyst as defined above.

Incidentally, though the conversion temperature to $\alpha$-(alpha-)alumina has been said to be about from 1,150° to 1,200° C., the heat treatment (firing) temperature adopted to make the catalyst carrier in the later appearing examples was 1,300° C. ± about 40° C.

This heat treatment may be performed preferably at a temperature from 1,200° to 1,380° C., and more preferably from 1,250° to 1,350° C. In general, a greater number of the finer pores and larger surface area of the catalyst carrier are obtained when the heat treatment temperature is lower than this range, and a smaller number of the finer pores and less surface area of the carrier are obtained when the heat treatment temperature is higher than this range. Both cases result in making it difficult to make a catalyst carrier suitable for the present invention.

The heat treatment for the conversion to $\alpha$-alumina is accomplished in an oxidative (or oxidizing) atmosphere such as air. The conversion treatment is performed for a time sufficient for the conversion, generally from three to five hours, preferably from two to four hours, with appropriate temperature-raising and lowering time.

There is no specified upper limit as to the pore volume of the pores having a pore diameter ranging from 0.1 to 0.5 micron and the pores having a pore diameter of more than 0.5 micron, but it is favorable to keep them not greater than 0.5 ml/g and 0.3 ml/g, respectively, in order to give certain practical compression strength to the carrier and eventually to the catalyst of the invention.

$\alpha$-(alpha-)alumina may be made by firing an alumina trihydrate such as alumina produced by electrical fusion, bialite and gibbsite. However, since alumina made as such has, in general, no such structure of fine pores as specified above, the catalytic activity to meet the purpose of the invention cannot be obtained by utilizing them as the carrier.

The catalyst of the invention is suitable for the reforming of lower hydrocarbons such as methane and lower alcohols such as methanol, and especially suitable for reforming of lower hydrocarbons with steam.

There is no specific limitation on the procedure for incorporating the nickel component into the porous body of $\alpha$-(alpha-)alumina. It is only necessary to distribute the nickel or nickel oxide homogeneously into the porous alumina surface area as widely as possible. A well known procedure of immersing the carrier in a solution of nickel salt is appropriate.

Active alumina having the aforementioned characteristics is, for instance, immersed in an aqueous solution of nickel nitrate After the aqueous solution is impregnated into the alumina to reach the center of the porous body, the alumina is dried at ambient temperature and then forced to dry at about 100°-130° C. The alumina is further heat-treated (calcined) by holding it at a temperature ranging favorably from 730° to 950° C., more favorably 800° to 920° C., and most favorably from 850° to 900° C., to give a catalyst of the invention. The activity of the catalyst decreases when the firing temperature is higher than this range; whereas the activity of the catalyst, which is high enough initially, is gradually lost along with the time of utilization thereof when the firing temperature is lower than this range.

A suitable time for the calcination (or calcining or firing) of the carrier impregnated with nickel is from one to ten hours. A longer calcination is favorable when a large amount of nickel is to be carried or when the calcining temperature is lower. Generally, from 2.5 to 4.0 hours of firing at from 850° to 950° C. is sufficient to obtain a catalyst of the invention carrying about eight percent of nickel in weight, as converted to a nickel oxide basis.

The firing of the carrier impregnated with nickel is carried out under an oxidative atmosphere represented by air.

Incidentally, this calcination may be accomplished for such carriers which have been insufficiently calcined, at least partially before the application of the catalyst, in the reactor where it is utilized, for instance, if circumstances permit.

In the catalyst of the invention, far less deposition of carbon is found than in conventionally available catalysts, even without any addition of an alkali metal element or the like, because the nickel is homogeneously distributed on a carrier having pores specified as above. Conventional catalysts are disclosed in Japanese patent publication No. B 57-50533 and U.S. Pat. No. 4,285,837.

BRIEF DESCRIPTION OF DRAWING

FIG. 1 is a graph showing a variation of the activity of the catalyst of the invention with change of reaction temperature.

EXAMPLES

The catalyst of the invention will be illustrated with reference to the following examples, without restricting the invention to these.

EXAMPLE 1

A catalyst of the invention was prepared as follows.

Porous body particles of o-(alpha-)alumina of average particle diameter of 5 mm, in which the pore volume given by the pores of the pore diameter ranging from 0.1 to 0.5 micron was 0.22 ml/g and the pore volume given by the pores of the pore diameter of more than 0.5 micron was 0.07 ml/g was immersed in 1l of an aqueous solution containing 1.3 kg of nickel nitrate ($Ni(NO_3)_2 \cdot 6H_2O$), and dried overnight at an ambient temperature. The particles are further dried by heating at 120° C. for six hours, then the temperature was raised to from 850° C. to 900° C. in from five to six hours, and the particles were kept at this temperature for three hours.

The catalyst thus obtained contained 8% by weight of nickel (value calculated in terms of nickel oxide). This catalyst will be hereinafter called "Catalyst A".

A catalyst with the same content of nickel as Catalyst A was obtained in the same way as Catalyst A except that the raising time to the firing temperature, the temperature and the time of the firing were five hours, from 690° to 710° C. and ten hours, respectively. This catalyst will be hereinafter called "Catalyst A-1".

A catalyst with the same content of nickel as Catalyst A was obtained in the same way as Catalyst A except that the raising time to the firing temperature, the temperature and the time of the firing were six hours, from 990° to 1,010° C. and three hours, respectively. This catalyst will be hereinafter called "Catalyst A-2".

Further, belowmentioned Catalyst B and Catalyst C were prepared.

Catalyst B

Catalyst B was prepared as follows:

Porous body particles of α-(alpha-)alumina of average particle diameter of 5 mm, in which the pore volume given by the pores of the pore diameter ranging from 0.1 to 0.5 micron was 0.05 ml/g and the pore volume given by the pores of the pore diameter of more than 0.5 micron was 0.2 ml/g was made to carry (or impregnated with) 8.6% by weight of nickel (value calculated in terms of nickel oxide), by a similar method as in Catalyst A.

Catalyst C

Catalyst C was prepared as follows:

Porous body particles of α-alumina of average particle diameter of 5 mm, in which the pore volume given by the pores of the pore diameter ranging from 0.1 to 0.5 micron was 0.21 ml/g and the pore volume given by the pores of the pore diameter of more than 0.5 micron was 0(zero) ml/g was made to carry 8.6% by weight of nickel (value calculated in terms of nickel oxide), by a similar method as in Catalyst A.

Each of the above catalysts was packed into a reactor tube with inside diameter of 12.3 mm, then the temperature of the catalyst layer was raised to 800° C., and then each of the catalysts was reduced for twenty hours with steam and methane at a S/C ratio, i.e., a molar steam-to-carbon ratio (carbon contained in or composing methane), of 7.0 and at a space velocity $SVo = 1,000 \ h^{-1}$.

Thereafter, each catalyst layer was utilized for steam reforming experiment. Methane and steam were fed into the reactor tube under the conditions of S/C=3.0, reaction pressure P=0.2 kg/cm²G, and $SVo = 8,000 \ h^{-1}$.

The reaction product of each experiment was recovered through a cooler to remove water and then through a gas meter and analyzed by gas-chromatography. The reaction was performed continuously for five hundred hours. The results are shown in Table 1. The value 0 (zero) in the reaction time column means the starting point of the reaction which is right after the reduction treatment mentioned above, and "approach temperature" is a difference between the equilibrium temperature calculated from the composition of the reaction system and the actually measured temperature in the experiment.

TABLE 1

| Catalyst | Reaction Time (hr) | Reaction Temperature (°C.) | Approach Temperature in Steam Methane Reforming (°C.) | Composition of Reaction Product Gas (vol. %) | | | |
|---|---|---|---|---|---|---|---|
| | | | | $H_2$ | CO | $CO_2$ | $CH_4$ |
| A | 0 | 690 | 14.9 | 75.6 | 13.0 | 9.2 | 2.2 |
| | 500 | 690 | 14.9 | 75.6 | 13.0 | 9.2 | 2.2 |
| A-1 | 0 | 690 | 12.8 | 75.4 | 12.8 | 12.8 | 2.6 |
| | 500 | 690 | 137.9 | 62.0 | 7.6 | 7.6 | 20.5 |
| A-2 | 0 | 690 | 50.2 | 73.3 | 11.5 | 11.5 | 5.5 |
| B | 0 | 690 | 42.1 | 74.0 | 16.5 | 6.1 | 3.4 |
| C | 0 | 690 | 16.6 | 75.5 | 13.3 | 8.9 | 2.3 |

TABLE 1-continued

| Catalyst | Reaction Time (hr) | Reaction Temperature (°C.) | Approach Temperature in Steam Methane Reforming (°C.) | Composition of Reaction Product Gas (vol. %) | | | |
|---|---|---|---|---|---|---|---|
| | | | | $H_2$ | CO | $CO_2$ | $CH_4$ |
| | 500 | 690 | 124 | 65.7 | 9.2 | 9.5 | 15.6 |

A high catalytic activity was shown by the result with Catalyst A, and substantially no reduction of catalytic activity was observed.

Catalyst A-1 showed a high initial activity followed by a large activity loss, and Catalyst A-2 had somewhat less initial activity.

A low catalytic activity was shown with Catalyst B, presumably due to the reason that it had a pore volume over 0.05 ml/g regarding the pores with diameter more than 0.5 micron but another requirement of the invention was not fulfilled.

With Catalyst C, a big loss of catalytic activity was observed presumably due to the reason that it had a pore volume of more than 0.2 ml/g with respect to the pores with diameter from 0.1 to 0.5 micron but another requirement of the invention was not fulfilled.

EXAMPLE 2

The steam reforming activity of Catalyst A utilized in EXAMPLE 1 regarding n-hexane was measured. The reaction conditions were: S/C=3.0, reaction pressure P=0.2 kg/cm²G, SVo=12,000 h⁻¹.

The result is illustrated in Table 2. A high activity was observed as in the case of methane.

TABLE 2

| Reaction Temperature (°C.) | Composition of Reaction Product Gas (vol. %) | | | |
|---|---|---|---|---|
| | $H_2$ | CO | $CO_2$ | $CH_4$ |
| 700 | 70.6 | 13.5 | 13.7 | 2.2 |

EXAMPLE 3

The variation of the catalytic activity of the Catalyst A utilized in EXAMPLE 1 to the variation of the temperature was examined. The reaction conditions were: S/C=3.0, P=0.2 kg/cm²G, SVo=10,000 h⁻¹.

Methane and steam were fed into the reactor tube, and the temperature at the exit of the catalyst layer (reaction temperature) was varied from 650 to 850° C. The result is shown in Table 3 and FIG. 1.

TABLE 3

| Reaction Temperature (°C.) | Approach Temperature in Steam Methane Reforming (°C.) | Methane Content in Reaction Product Gas (Dry vol. %) |
|---|---|---|
| 650 | 27.1 | 5.7 |
| 700 | 43.9 | 2.8 |
| 750 | 63.2 | 1.4 |
| 800 | 83.0 | 0.6 |
| 850 | 102.0 | 0.3 |

We claim:

1. A catalyst for a steam reforming process comprising a porous aluminum oxide carrier and a material selected from the group consisting of nickel and nickel oxide, said porous aluminum oxide carrier being α-alumina and having a pore volume of not less than 0.2 ml/g for pores having a pore diameter of from 0.1 to 0.5 micron, a pore volume of not less than 0.05 ml/g for pores having a pore diameter greater than 0.5 micron and a purity of not less than 98% by weight, said material being impregnated in said carrier in an amount of from 3 to 20% by weight, said % by weight being determined on a nickel oxide basis.

2. A catalyst as claimed in claim 1, wherein said pore volume of said pores having a pore diameter ranging from 0.1 to 0.5 micron is not more than 0.5 ml/g and the pore volume of said pores having a pore diameter of more than 0.5 micron is not more than 0.3 ml/g.

3. A catalyst as claimed in claim 1, wherein said material is nickel oxide.

4. A catalyst as claimed in claim 1, wherein said material is nickel.

5. A catalyst as claimed in claim 3, wherein said nickel oxide is impregnated in said carrier by immersing said carrier in a solution containing a nickel compound to impregnate the nickel compound therein, removing the carrier from the solution, drying the carrier and calcining the carrier in an oxidative atmosphere.

6. A catalyst as claimed in claim 5, wherein said dried carrier is calcined at a temperature of from 730° to 950° C.

7. A catalyst as claimed in claim 5, wherein said dried carrier is calcined at a temperature of from 800° to 920° C.

8. A catalyst as claimed in claim 5, wherein said dried carrier is calcined at a temperature of from 850° to 900° C.

9. A catalyst as claimed in claim 5, wherein said dried carrier is calcined under an oxidative atmosphere.

10. A catalyst as claimed in claim 4, wherein said nickel is impregnated in said carrier by immersing said carrier in a solution containing a nickel compound to impregnate the nickel compound therein, removing the carrier from the solution, drying the carrier, calcining the carrier in an oxidative atmosphere and subjecting the carrier to a reducing atmosphere.

11. A catalyst as claimed in claim 10, wherein said carrier is subjected to said reducing atmosphere during said steam reforming process.

* * * * *